March 16, 1954 A. E. FORSYTH 2,672,183
SEAT CUSHION
Filed Feb. 24, 1949 2 Sheets-Sheet 1
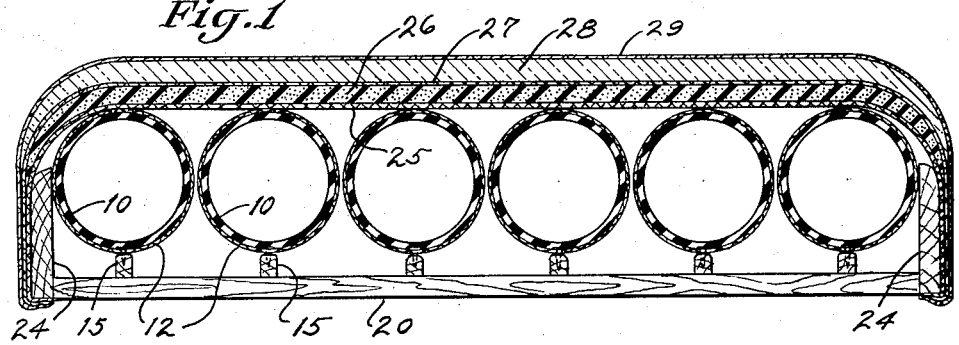
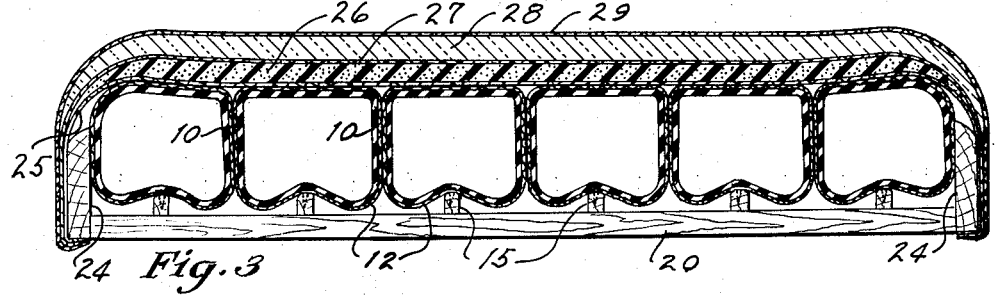
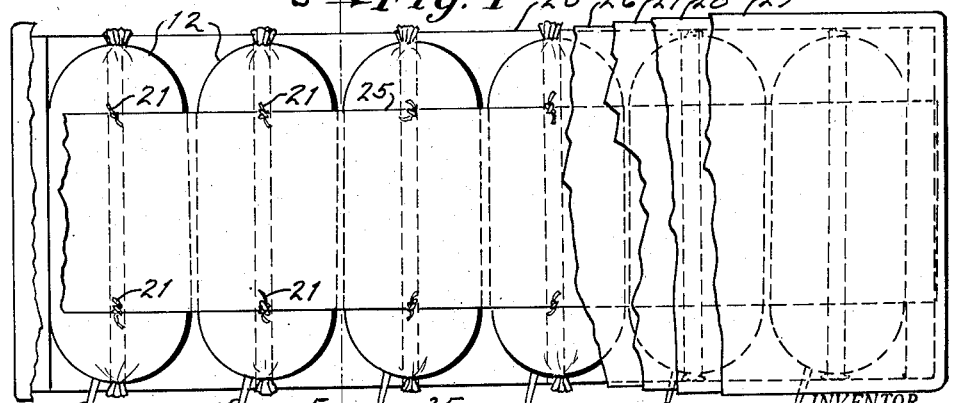
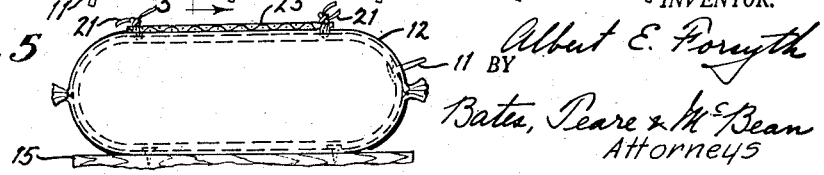
INVENTOR.
Albert E. Forsyth
BY Bates, Peare & McBean
Attorneys March 16, 1954     A. E. FORSYTH     2,672,183
SEAT CUSHION
Filed Feb. 24, 1949     2 Sheets-Sheet 2
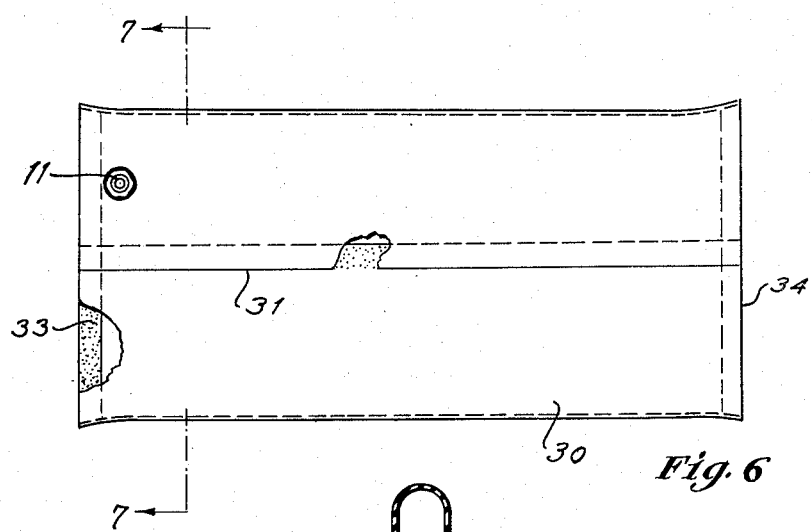
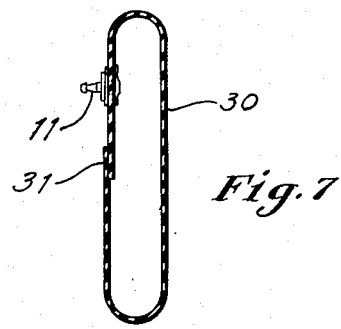
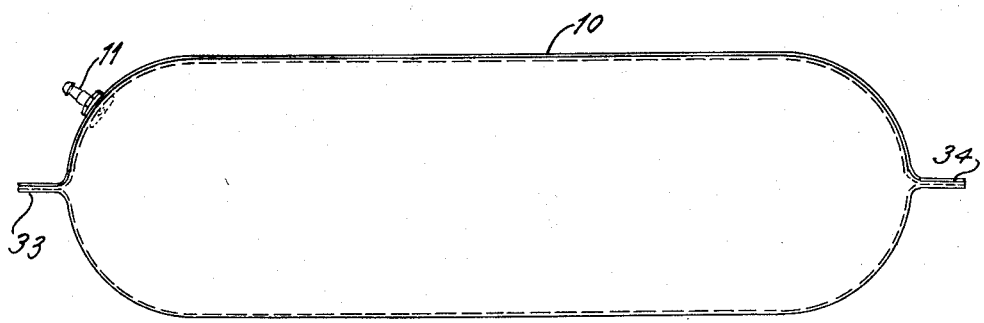

Patented Mar. 16, 1954

2,672,183

UNITED STATES PATENT OFFICE 2,672,183

SEAT CUSHION

Albert E. Forsyth, Ottawa, Ontario, Canada

Application February 24, 1949, Serial No. 78,043

5 Claims. (Cl. 155—179)

This invention relates to seat cushions and particularly to those that are used in automobiles, public carriers and the like. The present application is a continuation in part of my application, Serial No. 760,655, which was filed July 12, 1947, now Patent No. 2,627,077, for a Cushioning Device, and of my application, Serial No. 49,472, which was filed September 16, 1948, now Patent No. 2,627,302, for a Seat Cushion.

Heretofore, upholstered seat cushions have usually consisted of a frame, a padded cover and interposed metallic springs. Ordinarily the springs have been helical in form and have been securely fastened to the frame in a regular pattern with respect thereto.

An object of the present invention is to make a resilient seat which eliminates the necessity for the use of metallic springs, and which is adequately suited for use in seats of various shapes and sizes and which is also capable of adjustment for any predetermined load.

In the drawings, Fig. 1 is a vertical section taken through a seat embodying the present invention and showing the seat in unloaded condition; Fig. 2 is a section showing a detail of the connection between the pneumatic element and saddle but on a scale larger than that of Fig. 1; Fig. 3 is a section similar to Fig. 1 but illustrating the seat in loaded condition; Fig. 4 is a top plan view of the seat showing a portion thereof broken away; Fig. 5 is a section taken on a plane indicated by the line 5—5 of Fig. 4; Fig. 6 is a top plan view showing a step in the preferred method of making pneumatic elements; Fig. 7 is a section taken on the plane indicated by the line 7—7 in Fig. 6, and Fig. 8 is a side view of the inflated element remote from the fabric casing.

In the various drawings, the seat cushion includes a plurality of generally cylindrical resilient inflatable elements 10, each of which has a valve 11 therein for inflation purposes. Each element preferably has a wall thickness comparable to that of an inner tube of a passenger automobile tire, and the elements are disposed in side by side substantially parallel relationship and are positioned generally transversely of the longitudinal direction of the seat. Each element is inflated to suit the convenience of the rider, but I have found that inflation to an amount less than one pound per square inch produces a satisfactory riding quality.

Each pneumatic element is preferably housed in a fabric casing 12 which may be provided with an opening through which the valve 11 projects. Each casing has a snug fit with its associated element and the casings are in contiguous engagement so as to provide mutual support for each other.

Each pneumatic element unit is supported upon a bar 15 which extends longitudinally of the element and the bars in turn are supported upon a base plate 20. In practice, each bar 15 preferably has a flat portion on the top thereof with rounded edges, and for best results, the width of each bar is substantially one-eighth the outer diameter of the associated pneumatic element. Each element may be held in position by fastening the casing to the associated bar by a cementing or tacking operation.

The seat frame may be completed by the use of end plates 24 which are fastened to the bottom plate 20 in any suitable manner, while the upholstering may include a fabric strip 25 which extends around the end plates and across the respective elements. Each casing 12 may, if desired, be fastened to the strip 25 by ties 21. Superimposed upon the strip of fabric 25 may be a layer 26 of sponge rubber, over which there may be placed a liner 27 of fabric, and then a layer 28 of felt. A covering layer 29 of upholstering material then extends over the entire assembly and provides a complete housing therefor. The liner and layer of upholstery material may be apertured for providing access to the air valve 11.

The pneumatic elements which are used with this invention may be molded to the form having a generally cylindrical shape with rounded ends, but a preferred way of making it is to take a rectangular sheet 30 of rubber, fold it so as to overlap the edges on the line 31, and then vulcanize it along the line 31 and along the edges 33 and 34. Prior to vulcanization, however, a valve 11 is inserted so that after vulcanization has been completed, the element can be inflated, at which time it will assume a position indicated in Fig. 8.

The casing for each element may be a cylindrical fabric structure, the ends of which are open for receiving an element. The ends are adapted to be closed by drawstrings and tied to retain the element in place therein.

An advantage of the present invention is the fact that the riding qualities of a vehicle are greatly increased because vibration is more readily absorbed before it reaches the occupant on the seat. A further advantage is that the seat may be constructed without the use of metallic springs.

I claim:

1. A seat comprising a plurality of pneumatic elements arranged in side by side relationship, each having a generally cylindrical formation with rounded ends and each having a valve carried thereby, a fabric casing enclosing each element, a rigid bar fastened to each casing and adapted to support the casing in the direction of the cylindrical axis, a base connecting said bars and holding them in parallel predetermined spaced position, a fabric strip extending transversely across the respective elements and connected at its ends to the base, and a layer of upholstery material positioned above the bars and elements and also fastened to the base.

2. A seat comprising a plurality of pneumatic elements having a generally cylindrical formation and rounded ends, the elements being disposed in side by side relationship and each having a valve therein through which the element may be inflated, a flexible casing enclosing each element, each of said casings having an aperture through which the valve projects, rigid bars extending generally longitudinally of the elements and supporting them only on the bottom surfaces thereof, means securing each casing to the corresponding bar at its supported surface each bar having a generally rounded upper surface and having a width approximately one-eighth of the outer diameter of the associated element, and a covering of upholstering material extending over and enclosing the elements.

3. A seat cover comprising, a rigid support, a plurality of rigid narrow bars supported by said support in spaced parallel fixed relation to each other, an inflatable resilient elongated element mounted on each bar with its axis in substantial vertical alignment with its respective bar, each of said elements having a width substantially equal to the spacing of said bars, each element having an individual retaining cover, means securing the respective covers at their supported surface to the respective bars, a rigid confining member mounted on said support adjacent the outer sides of the extreme elements, a flexible confining strip extending transversely across the top of all of said elements and having its ends secured to said end members, means individually connecting each of said covers to said strip, and a layer of upholstery material superposed on said strip and completing the enclosure of said elements.

4. A seat comprising, a rigid support having a pair of upstanding end members, a plurality of rigid bars supported by said support between said end members and in spaced parallel fixed relation to each other, an inflatable resilient substantially cylindrical element mounted on top of each bar with its axis substantially parallel and in vertical alignment therewith, each of said elements having a diameter substantially equal to the spacing of said bars, each element having an individual fabric retaining cover at its supported surface, means securing each cover to its respective bar, a fabric strip extending transversely across the top of all of said elements and having its ends secured to said support, means individually connecting each of said covers to said strip at points substantially over said bars, and a layer of upholstery material supported by and completing the enclosure of said elements.

5. A seat cushion comprising, a rigid planar support, a row of rigid bars extending across and fixedly supported by said support comprising a plurality of laterally spaced bars in lateral alignment one with the other and having transversely rounded upper surfaces, an individual inflatable elongated resilient substantially cylindrical element mounted on top of each bar with its axis substantially parallel with the respective bar and in substantial vertical alignment therewith, each of said elements having a diameter such as will normally cause it to substantially contact the next adjacent element, each element having an individual fabric retaining cover, a fabric confining strip extending transversely across the top of said elements and having its ends secured to said support, means respectively connecting opposite sides of each of said covers to said strip and to their respective bars at points in substantial vertical alignment with the respective bars, and a layer of upholstery material supported by said strip and elements and substantially completing the enclosure of said elements.

ALBERT E. FORSYTH.

References Cited in the file of this patent

UNITED STATES PATENTS

| Number | Name | Date |
|---|---|---|
| 1,711,255 | Weinman et al. | Apr. 30, 1929 |
| 1,746,709 | Marshall | Feb. 11, 1930 |
| 1,823,569 | Mellano | Sept. 15, 1931 |
| 2,099,870 | Stanley et al. | Nov. 23, 1937 |

FOREIGN PATENTS

| Number | Country | Date |
|---|---|---|
| 191,180 | Great Britain | Jan. 11, 1923 |